(12) United States Patent
Landis, Jr. et al.

(10) Patent No.: US 7,783,462 B2
(45) Date of Patent: Aug. 24, 2010

(54) RESERVOIR EVALUATION METHODS

(75) Inventors: Lester H. Landis, Jr., Houston, TX (US); Peter N. Glenton, Victoria (AU); Leslie A. Wahrmund, Kingwood, TX (US); Sameer A. Khan, Sugar Land, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 973 days.

(21) Appl. No.: 10/575,563

(22) PCT Filed: Jan. 24, 2005

(86) PCT No.: PCT/US2005/001932

§ 371 (c)(1),
(2), (4) Date: Apr. 12, 2006

(87) PCT Pub. No.: WO2005/076124

PCT Pub. Date: Aug. 18, 2005

(65) Prior Publication Data

US 2008/0249906 A1   Oct. 9, 2008

Related U.S. Application Data

(60) Provisional application No. 60/540,770, filed on Jan. 30, 2004.

(51) Int. Cl.
G06G 7/48 (2006.01)

(52) U.S. Cl. .................................... 703/10
(58) Field of Classification Search ................. 703/10
See application file for complete search history.

(56) References Cited

U.S. PATENT DOCUMENTS 5,018,112 A    5/1991  Pinkerton et al.
5,757,663 A    5/1998  Lo et al.
5,835,882 A   11/1998  Vienot et al.
5,835,883 A   11/1998  Neff et al.
6,106,561 A    8/2000  Farmer (Continued)

FOREIGN PATENT DOCUMENTS

| WO | WO 00/48022 | 8/2000 |
| WO | WO 00/79423 A1 | 12/2000 |
| WO | WO 2005/074592 A2 | 8/2005 |

OTHER PUBLICATIONS

Vasco et al.; Integrating dynamic data into high resolution reservoir models using streamline based analytic sensitivity coefficients; one page; 1998, SPE.*

J. E. Aarnes et al., "Toward Reservoir Simulation on Geological Grid Models", European Conference on the Mathematics of Oil Recovery, Cannes, France, Aug. 30-Sep. 2, 2004, pp. 1-8.

(Continued)

*Primary Examiner*—Hugh Jones
(74) *Attorney, Agent, or Firm*—ExxonMobil Upstream Research Co. Law Dept.

(57) ABSTRACT

Described herein are methods of evaluating reservoirs. At least one of the methods includes providing a three dimensional reservoir framework having a plurality of cells; assigning one or more constant reservoir property values to some or all of the cells to provide a first three dimensional reservoir model; updating the first three dimensional reservoir model by populating some or all of the cells with one or more variable reservoir property values to provide a second three dimensional reservoir model; and updating the second three dimensional reservoir model by populating some or all of the cells with one or more reservoir property values derived from seismic data to provide a third three dimensional reservoir model. Other methods are also described.

25 Claims, 5 Drawing Sheets

U.S. PATENT DOCUMENTS

| | | | |
|---|---|---|---|
| 6,302,221 | B1 | 10/2001 | Hamman et al. |
| 6,374,201 | B1 | 4/2002 | Grizon et al. |
| 6,549,854 | B1 | 4/2003 | Malinverno et al. |
| 6,662,109 | B2 | 12/2003 | Roggero et al. |
| 6,662,146 | B1 | 12/2003 | Watts |
| 6,694,264 | B2 | 2/2004 | Grace |
| 6,754,588 | B2 | 6/2004 | Cross et al. |
| 6,792,354 | B1 | 9/2004 | O'Meara, Jr. |
| 6,826,483 | B1 | 11/2004 | Anderson et al. |
| 6,865,486 | B2 | 3/2005 | Tobias et al. |
| 6,950,751 | B2 | 9/2005 | Knobloch |
| 6,980,940 | B1 | 12/2005 | Gurpinar et al. |
| 7,363,163 | B2 * | 4/2008 | Le Ra Valec-Dupin et al. ............ 702/12 |
| 2003/0046005 | A1 | 3/2003 | Haarstad |

OTHER PUBLICATIONS

M. Abbaszadeh et al., "Integrated Geostatistical Reservoir Characterization of Turbidite Sandstone Deposits in Chicontepec Basin, Gulf of Mexico", SPE 84052, Oct. 5, 2003, pp. 1-15, XP002289310.

J. S. Gomes et al., "Geological Modeling of a Tight Carbonate Reservoir for Improved Reservoir Management of a Miscible WAG Injection Project, Abu Dhabi, U.A.E.", SPE 78529, Oct. 13, 2002, pp. 1-11, XP002289311.

K. Gruchalla, "Immersive Well-Path Editing: Investigating the Added Value of Immersion", Proceedings of the 2004 IEEE Virtual Reality, Chicago, Il, Mar. 27-31, 2004, pp. 157-164.

R. P. Kendall et al., "The Impact of Vector Processors on Petroleum Reservoir Simulation", Proceedings of the IEEE, vol. 72 No. 1, Jan. 1984, pp. 85-89.

J. G. Kim et al., "Toward a Grid-Based Simulation of Multiphase Fluid Flow in Porous Media", Proceedings of the 18$^{th}$ International Parallel and Distributed Processing Symposium, IEEE, 2004, 4 pages.

P. Mendoza et al., "Fault Interpretation Strategy for 3D model Simulation", SPE 78994, Nov. 4, 2003, pp. 1-11, XP02289312.

V. Mottl et al., "Pattern Recognition in Spatial Data: A New Method of Seismic Explorations for Oil and Gas in Crystalline Basement Rocks", IEEE, 2000, pp. 315-318.

S. Narayanan et al., "Applying Database Support for Large Scale Data Driven Science in Distributed Environments", Proceedings of the Fourth International Workshop on Grid Computing, IEEE, Nov. 2003, pp. 141-148, 8 pages.

M. L. Sweet et al., "Modeling Heterogeneity in a Low-Permeability Gas Reservoir Using Geostatistical Techniques, Hyde Field, Southern North Sea", AAPG Bulletin, V. 80 No. 11, Nov. 1996, pp. 1719-1735.

G. J. J. Williams et al., "Top-Down Reservoir Modeling", SPE 89974, SPE Annual Technical Conference, Houston, Texas, Sep. 26-29, 2004, pp. 1-8.

T. Yu, "Evolving Cellular Automata to Model Fluid Flow in Porous Media", 2002 NASA/DOD Conference on Evolvable Hardware, IEEE, Jul. 2002, 8 pages.

European Search Report No. 111081, dated Jul. 30, 2004 for U.S. Appl. No. 60/540,770, 3 pages.

International Search Report and Written Opinion, mailed Jun. 7, 2005 for PCT/US05/01932, 8 pages.

International Preliminary Search Report for PCT/US05/01932, 6 pages.

*European Search Report*, EP Application No. 05711772.3, dated Mar. 9, 2010.

* cited by examiner

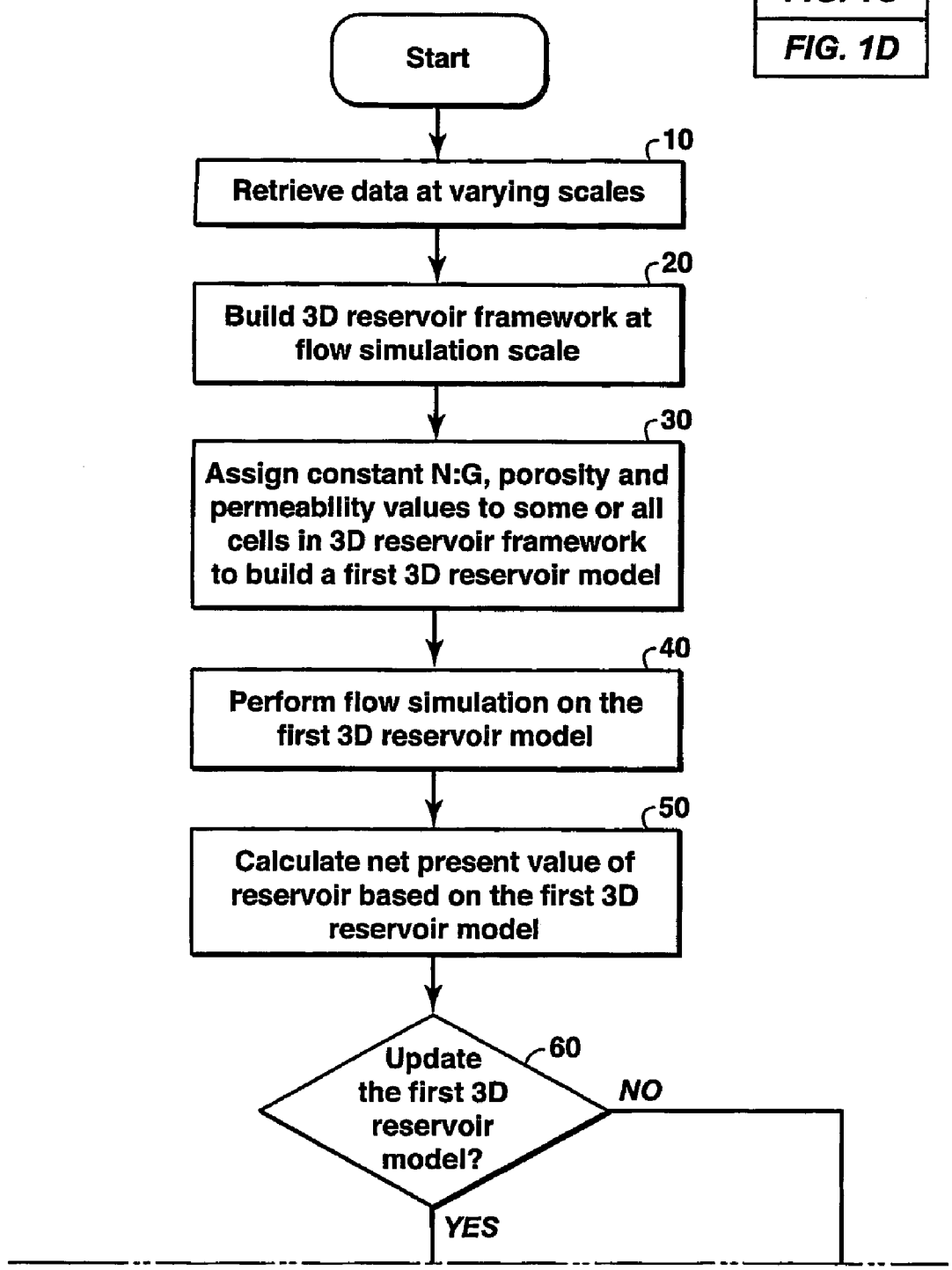

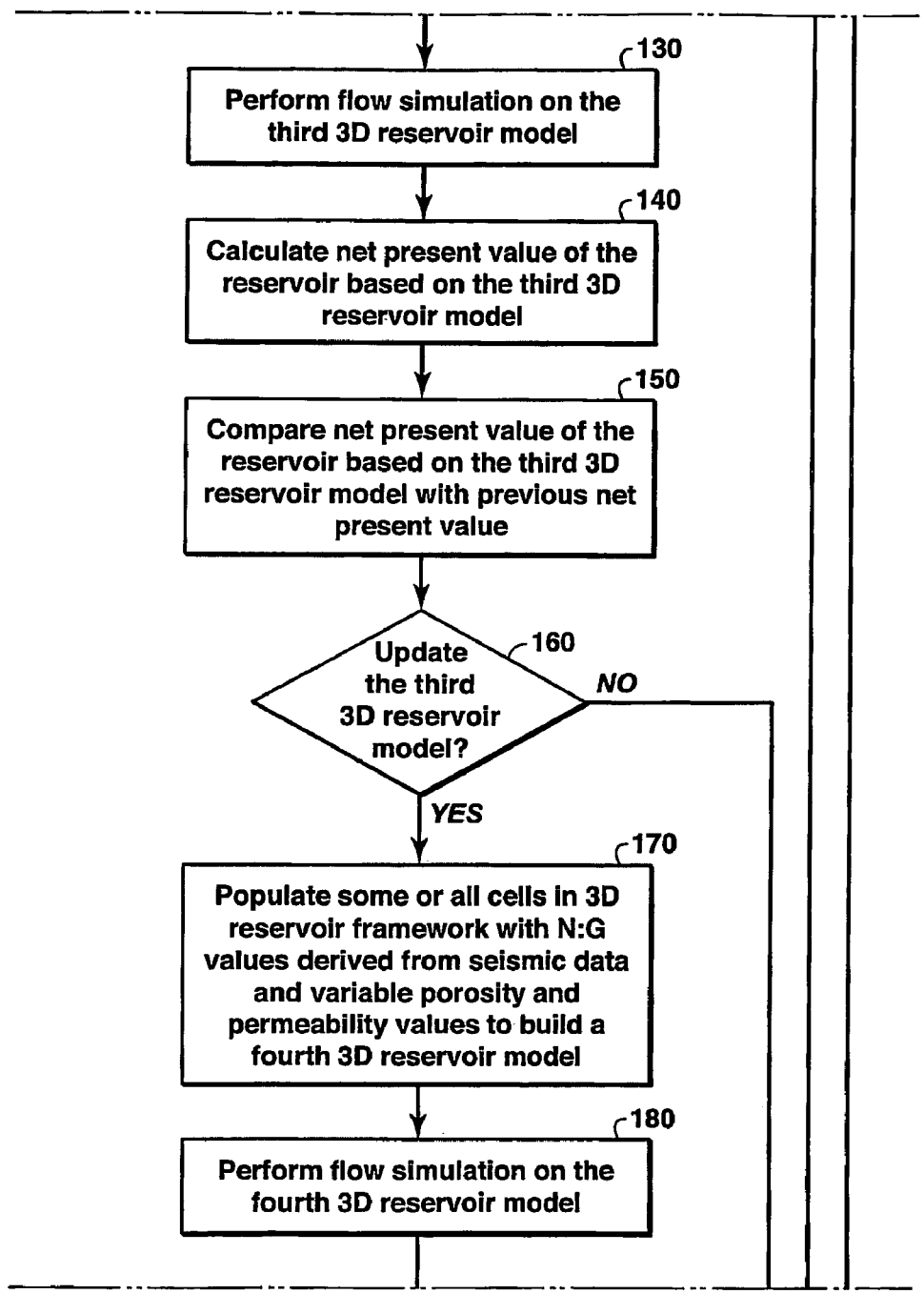

RESERVOIR EVALUATION METHODS

CROSS REFERENCE TO RELATED APPLICATIONS

This application claims the benefit of U.S. Provisional Application 60/540,770, filed Jan. 30, 2004.

BACKGROUND

1. Field of Invention

Embodiments of the invention are related to evaluation of subsurface reservoirs.

2. Description of Related Art

In the oil and gas industry, geologic models are often used to aid in activities, such as determining the locations of wells, estimating hydrocarbon reserves, or planning reservoir-development strategies, including evaluating the economic recovery of hydrocarbon resources. A geologic model typically is a computer-based representation of a subsurface earth volume, such as a petroleum reservoir or a depositional basin.

Geologic models may take on many different forms. Depending on the context, descriptive or static geologic models built for petroleum applications can be in the form of a 3-D array of cells, to which geologic and/or geophysical properties such as lithology, porosity, acoustic impedance, permeability, or water saturation are assigned (such properties will be referred to collectively herein as "reservoir properties").

Many geologic models are constrained by stratigraphic or structural surfaces (e.g., flooding surfaces, sequence interfaces, fluid contacts, faults) and boundaries (e.g., facies changes). These surfaces and boundaries define regions within the model that possibly have different reservoir properties.

Various approaches can be followed for evaluating a reservoir using geologic modeling. At least one approach is strictly sequential, involving sequential evaluations by several disciplines. With such an approach, a reservoir evaluation using geologic modeling might take several or many months to complete. With such an approach, due to the large amount of time necessary for evaluating a reservoir using geologic modeling, only one geologic model would tend to be built in connection with the reservoir evaluation. Consequently, such an approach would allow no realistic opportunity to learn how decisions are made during the geologic modeling process, or how such decisions would affect the final outcome. Such a strict sequential approach would also allow no opportunity to evaluate the inherent uncertainty in arriving at solutions to problems, considering the limited amount of data that would tend to be available for use in the geologic modeling as well as the level of interpretation required in the geologic modeling process.

Furthermore, such a strict sequential approach for evaluating a reservoir using geologic modeling would in all likelihood tend to involve building a geologic model made up of many millions of cells, e.g., 200 million cells, and require "upscaling" the geologic model in order to reduce the number of cells to no more than 500,000 cells so that flow simulation could be performed. Obviously, the steps of building geologic models and then upscaling them would tend to contribute further to the large amount of time needed to evaluate a reservoir using geologic modeling.

Accordingly, a need exists for improved methods of evaluating reservoir.

SUMMARY

Embodiments of the invention are directed to a method of evaluating a reservoir. In one embodiment, the method includes providing a three dimensional reservoir framework having a plurality of cells, assigning one or more constant reservoir property values to some or all of the cells to provide a first three dimensional reservoir model, updating the first three dimensional reservoir model by populating some or all of the cells with one or more variable reservoir property values to provide a second three dimensional reservoir model, and updating the second three dimensional reservoir model by populating some or all of the cells with one or more reservoir property values derived from seismic data to provide a third three dimensional reservoir model.

In another embodiment, the method includes providing a three dimensional reservoir framework at a flow simulation scale, wherein the three dimensional reservoir framework includes a plurality of cells, assigning one or more constant reservoir property values to some or all of the cells to provide a three dimensional reservoir model, performing a flow simulation on the three dimensional reservoir model, and performing an assessment of the reservoir based on the three dimensional reservoir model.

In yet another embodiment, the method includes providing a three dimensional reservoir framework having a plurality of cells, assigning one or more constant reservoir property values to some or all of the cells to provide a first three dimensional reservoir model, updating the first three dimensional reservoir model by populating some or all of the cells with one or more variable reservoir property values to provide a second three dimensional reservoir model, and comparing a net present value for the reservoir based on the first three dimensional reservoir model with a net present value for the reservoir based on the second three dimensional reservoir model.

In still another embodiment, the method includes providing a three dimensional reservoir framework, wherein the reservoir framework includes a plurality of cells, assigning one or more constant reservoir property values to some or all of the cells to provide a first three dimensional reservoir model, updating the first three dimensional reservoir model by populating some or all of the cells with one or more reservoir property values derived from seismic data to provide a second three dimensional reservoir model, and comparing a net present value for the reservoir based on the first three dimensional reservoir model with a net present value for the reservoir based on the second three dimensional reservoir model.

Other embodiments are described below, or can be developed or otherwise implemented by persons having ordinary skill in the art based on the information herein.

BRIEF DESCRIPTION OF THE DRAWINGS

FIGS. 1A-1D illustrate a flow diagram of a method for evaluating a reservoir, and is discussed in greater detail below.

DETAILED DESCRIPTION

Introduction and Definitions

Figure 1B:
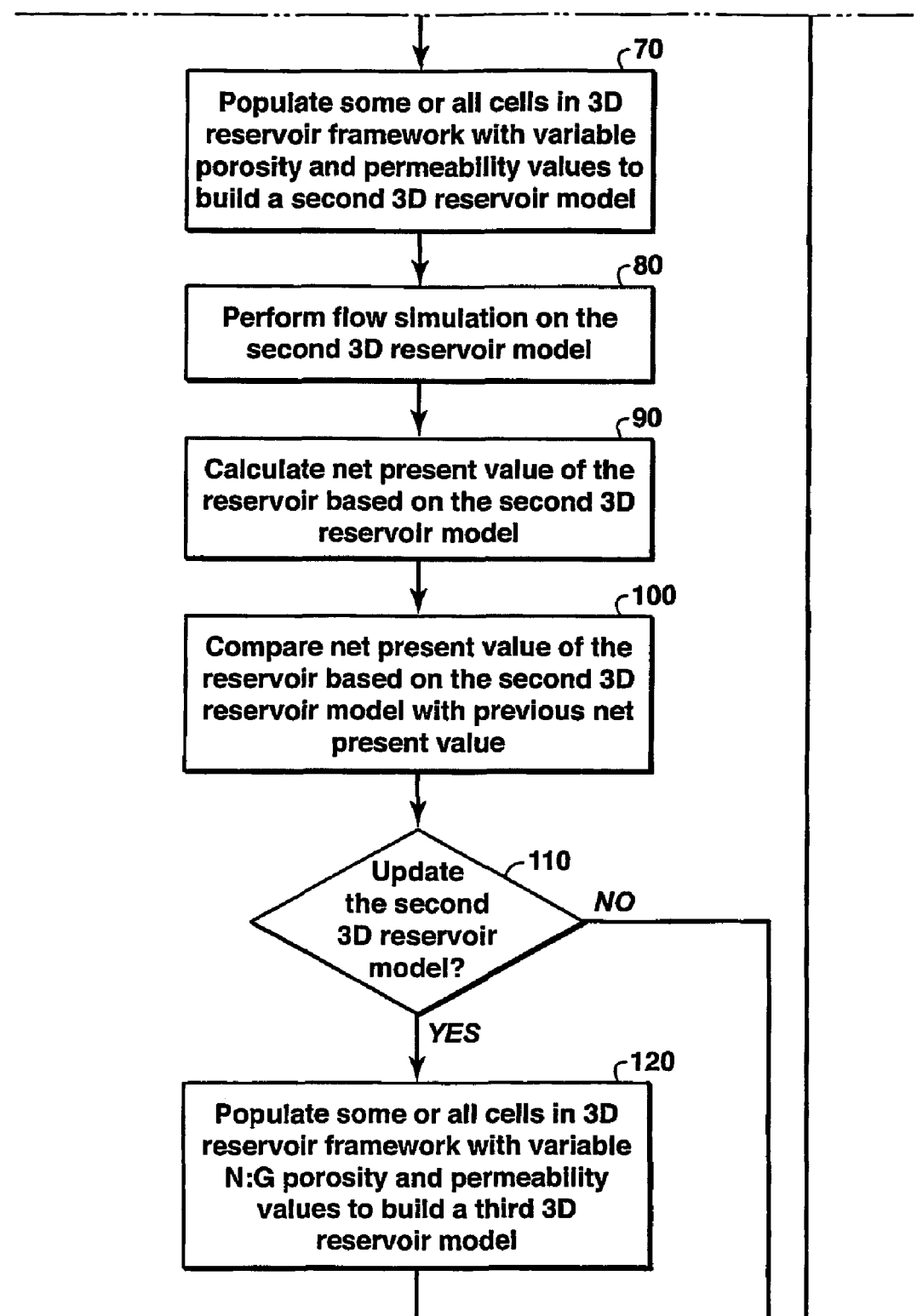
Figure 1D:
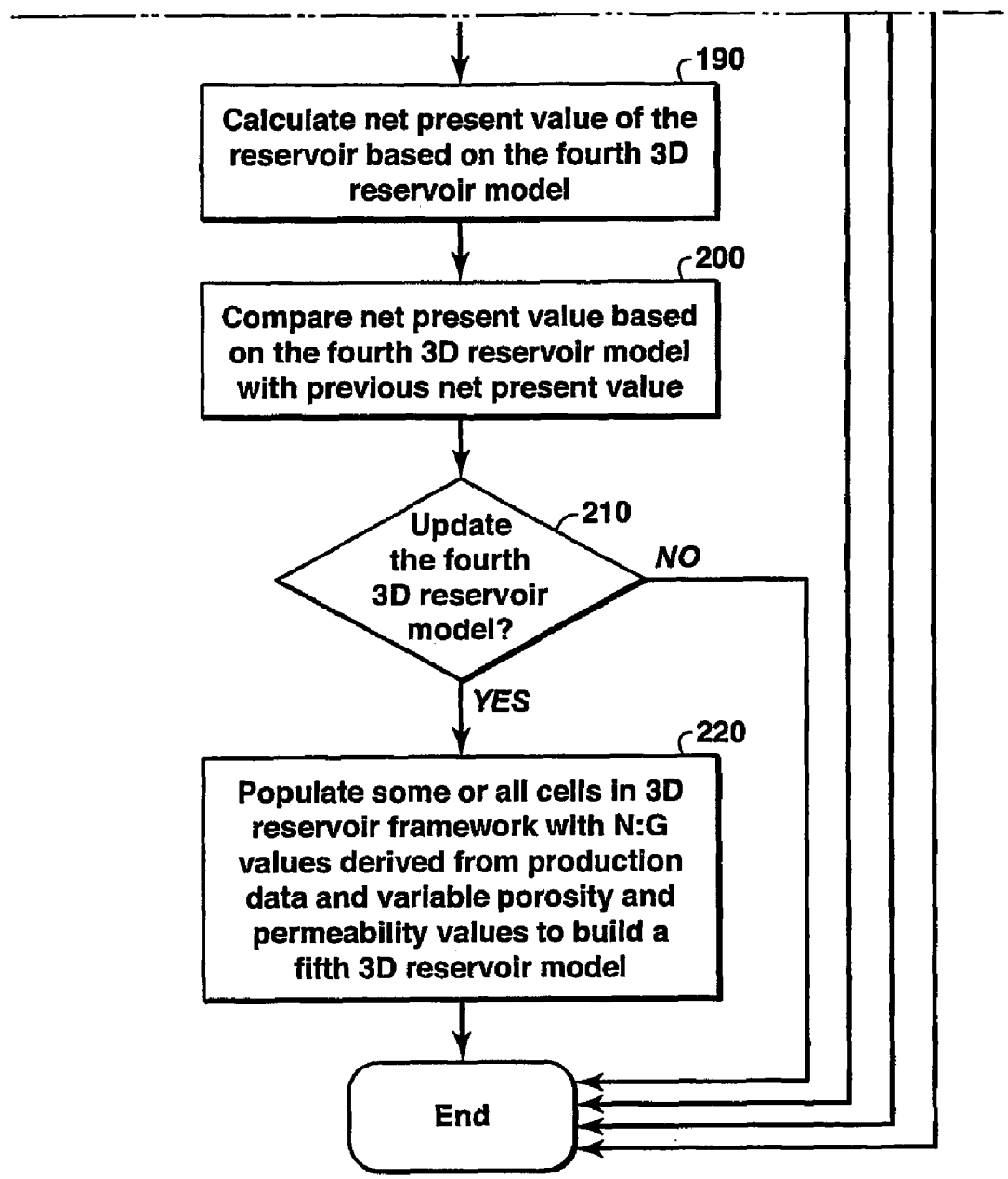

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

The term "cell" is defined as a unit or block that defines a portion of a three dimensional reservoir model. As such, a three dimensional reservoir model may include a number of cells, ranging from tens and hundreds to thousands and millions of cells. Each cell represents a specifically allocated portion of the three dimensional reservoir model. An entire set of cells may constitute a geologic model and thus represent the subsurface earth volume of interest. Each cell preferably represents a unique portion of the subsurface. As such, the cells preferably do not overlap each other. Dimensions of the cells are preferably chosen so that the reservoir properties within a cell are relatively homogeneous, yet without creating an excessive number of cells. Preferably, each cell is square or rectangular in plan view and have a thickness that is either constant or variable. However, it is contemplated that other shapes may alternatively be used.

The terms "reservoir properties" and "reservoir property values" are defined as quantities representing physical attributes of rocks containing reservoir fluids. The term "reservoir properties" as used in this application includes both measurable and descriptive attributes. Examples of measurable reservoir property values include rock-type fraction (e.g. net-to-gross, v-shale, or facies proportion), porosity, permeability, water saturation, and fracture density. Examples of descriptive reservoir property values include facies, lithology (e.g. sandstone or carbonate), and environment-of-deposition (EOD). Reservoir properties may be populated into a reservoir framework to generate a reservoir model.

The term "rock-type fraction" is defined as the ratio of the rock volume containing a specific rock-type that to the total (gross) rock volume. As such, the gross rock volume can be divided into 2 components: (1) rock volume containing a specific rock-type, and (2) rock volume containing all other rock types. So, rock-type fraction may be expressed as:

$$\text{rock-type fraction} = \frac{\text{volume of a specific rock-type}}{\text{total rock volume}}$$

Example of a rock-type fraction is v-shale (volume shale), typically calculated from electronic well log measurements and sometimes inferred from seismic data. Using the expression for rock-type fraction:

$$v\text{-shale} = \frac{\text{volume of shale}}{\text{total rock volume}}$$

The term "net-to-gross", also denoted N:G, as used herein includes the term v-shale (volume shale). The relationship between v-shale and net-to-gross may be expressed as follows:

net-to-gross=1−v-shale.

Furthermore, whenever the term "net-to-gross" or "N:G" is used herein, it will be understood that this is an example of a rock-type fraction, and that any other choice of rock-type fraction may be selected.

The term "porosity" is defined as the percent volume of pore space in a rock. Porosity is a measure of the reservoir rock's storage capacity for fluids. Porosity is preferably determined from cores, sonic logs, density logs, neutron logs or resistivity logs. Total or absolute porosity includes all the pore spaces, whereas effective porosity includes only the interconnected pores.

The term "permeability" is defined as the ability of a rock to transmit fluids through interconnected pores in the rock. Permeability can vary substantially within a hydrocarbon-bearing reservoir. Typically, permeabilities are generated for fine-scale models (geologic models) using data from well core samples. For simulation cells, the heterogeneities of the geologic model are accounted for by determining an effective permeability. An effective permeability of a heterogeneous medium is defined as the permeability of an equivalent homogeneous medium that, for the same boundary conditions, would give the same flux (amount of fluid flow across a given area per unit time).

The term "environments of depositions" (EOD) refers to the sum of physical conditions under which portions of a reservoir are formed. A reservoir is often sub-divided into different volumes to distinguish physical conditions that are believed to be present during formation of the reservoir that could lead to differences in reservoir property values (e.g. porosity and permeability). EOD may be derived from seismic data to isolate or divide a reservoir framework into various geologic regions, such as channel axes and channel margins.

The term "geostatistical estimation" is defined as a statistical estimation technique used to spatially correlate random variables in geological or geophysical applications. Geostatistical estimation involves techniques for interpolation and extrapolation of physical measurements using correlation and probability concepts. More specifically, geostatistical estimation takes into account distance, direction, and spatial continuity of the reservoir property being modeled. Geostatistical estimation may be either deterministic or probabilistic. Deterministic geostatistical estimation calculates a minimum-variance estimate of the reservoir property at each cell. Probabilistic geostatistical estimation develops distributions of the reservoir property values and produce a suite of geologic models for the reservoir property being modeled, with each model theoretically being equally probable. The spatial continuity of a reservoir property may be captured by a variogram, a well-known technique for quantifying the variability of a reservoir property as a function of separation distance and direction.

The term "flow simulation" is defined as a numerical method of simulating the transport of mass (typically fluids, such as oil, water and gas), energy, and momentum through a physical system using a computer. The physical system includes a three dimensional reservoir model, fluid properties, the number and locations of wells. Flow simulations also require a strategy (often called a well-management strategy) for controlling injection and production rates. These strategies are typically used to maintain reservoir pressure by replacing produced fluids with injected fluids (e.g. water and/or gas). When a flow simulation correctly recreates a past reservoir performance, it is said to be "history matched," and a higher degree of confidence is placed in its ability to predict the future fluid behavior in the reservoir.

The term "three dimensional reservoir model" is defined as a three dimensional framework of cells that contain reservoir property values.

The term "three dimensional framework" is defined as a numerical representation of a volume that is divided into cells. The numerical representation includes the total number of cells, their dimensions, and how they are connected to each other.

The term "flow simulation scale" refers to the dimensions (length, width, and thickness) of each cell (defined above) used to define a three dimensional reservoir model (defined above) on which flow simulation will be performed. Cell dimensions are preferably chosen so that the reservoir properties are relatively homogeneous within a cell. However, the minimum size of each cell is limited by the amount of computer memory available and the time required to solve the transport problem. In practice, cell dimensions are typically selected such that a flow simulation on a three dimensional reservoir model is completed within a 24-hour period.

The term "economic assessment" is defined as a process for calculating the various measures of monetary value for making a capital investment, such as, producing hydrocarbons from a reservoir. The process involves calculating the capital investment required to produce the hydrocarbons, the revenue from products that can be sold, and the production costs. Flow simulation provides the information required to make these calculations. Economic assessment typically requires the calculation of several quantities including, but not limited to, net present value, discounted cash flow rate, maximum cash impairment, and return on capital employed. In a broad aspect, the process of economic assessment may be performed in any conventional way. Preferably, economic assessment is performed using a computer, e.g., a computer workstation, with conventional software that is designed for economic assessment calculations.

The term "engineering assessment" refers to a process involving an analysis, preferably of flow simulation output, which may include production and injection rates, production and injection well pressures, and three dimensional visualizations of changes in fluid and pressure distributions over time, to learn the effects of geologic and engineering inputs on hydrocarbon production. For instance, an engineering assessment may be used to provide feedback on the relative value of knowing whether or not faults are barriers to flow. In a broad aspect, the engineering assessment may be performed in any conventional way. Preferably, engineering assessment is performed using a computer, e.g., a computer workstation, with conventional software that is designed for engineering assessment calculations.

SPECIFIC EMBODIMENTS

In at least one specific embodiment, a method of evaluating a reservoir includes: providing a three dimensional reservoir framework having a plurality of cells; assigning one or more constant reservoir property values to some or all of the cells to provide a first three dimensional reservoir model; updating the first three dimensional reservoir model by populating some or all of the cells with one or more variable reservoir property values to provide a second three dimensional reservoir model; and updating the second three dimensional reservoir model by populating some or all of the cells with one or more reservoir property values derived from seismic data to provide a third three dimensional reservoir model.

In a specific embodiment, the method identified above, or a method described elsewhere herein, further includes performing a flow simulation using at least one of the first, second or third three dimensional reservoir models.

In a specific embodiment of the method identified above, or of a method described elsewhere herein, providing the three dimensional reservoir framework includes building the three dimensional reservoir framework.

In a specific embodiment of the method identified above, or of a method described elsewhere herein, constant reservoir property values includes a plurality of constant net-to-gross values.

In a specific embodiment of the method identified above, or of a method described elsewhere herein, variable reservoir property values includes a plurality of constant porosity values.

In a specific embodiment of the method identified above, or of a method described elsewhere herein, variable reservoir property values include a plurality of constant permeability values.

In a specific embodiment of the method identified above, or of a method described elsewhere herein, variable reservoir property values include a plurality of variable net-to-gross values.

In a specific embodiment of the method identified above, or of a method described elsewhere herein, variable reservoir property values include a plurality of variable porosity values.

In a specific embodiment of the method identified above, or of a method described elsewhere herein, variable reservoir property values include a plurality of variable permeability values.

In a specific embodiment of the method identified above, or of a method described elsewhere herein, the reservoir property values derived from the seismic data includes a plurality of net-to-gross values derived from seismic data.

In a specific embodiment of the method identified above, or of a method described elsewhere herein, updating the second three dimensional reservoir model includes populating some or all of the cells with variable porosity values.

In a specific embodiment of the method identified above, or of a method described elsewhere herein, updating the second three dimensional reservoir model includes populating some or all of the cells with variable permeability values.

In a specific embodiment of the method identified above, or of a method described elsewhere herein, each cell has a preselected scale.

In a specific embodiment of the method identified above, or of a method described elsewhere herein, providing a three dimensional reservoir framework includes providing the three dimensional reservoir framework at a flow simulation scale.

In a specific embodiment of the method identified above, or of a method described elsewhere herein, providing a three dimensional reservoir framework includes defining a top and bottom surface of the reservoir framework.

In a specific embodiment of the method identified above, or of a method described elsewhere herein, providing a three dimensional reservoir framework includes dividing the three dimensional reservoir framework into one or more stratigraphic sequences.

In a specific embodiment of the method identified above, or of a method described elsewhere herein, providing a three dimensional reservoir framework includes dividing the three dimensional reservoir framework into one or more stratigraphic sequences; and dividing each stratigraphic sequence into one or more layers.

In a specific embodiment of the method identified above, or of a method described elsewhere herein, the constant reservoir property values are average values.

In a specific embodiment of the method identified above, or of a method described elsewhere herein, the net present value for the reservoir is based on the first three dimensional reservoir model.

A specific embodiment of the method identified above, or of a method described elsewhere herein, further includes: calculating a net present value for the reservoir based on the first three dimensional reservoir model; calculating a net present value for the reservoir based on the second three dimensional reservoir model; and comparing the net present value for the reservoir based on the second three dimensional reservoir model with the net present value for the reservoir based on the first three dimensional reservoir model.

A specific embodiment of the method identified above, or of a method described elsewhere herein, further includes determining whether at least one of the first, second or third three dimensional reservoir models need to be updated.

In a specific embodiment of the method identified above, or of a method described elsewhere herein, the variable reservoir property values are populated using geostatistics.

A specific embodiment of the method identified above, or of a method described elsewhere herein, further includes updating the third three dimensional reservoir model by populating some or all of the cells in the three dimensional reservoir framework with a plurality of net-to-gross values derived from production data.

A specific embodiment of the method identified above, or of a method described elsewhere herein, further includes retrieving data at one or more scales, and deriving one or more reservoir property values from such data.

A specific embodiment of the method identified above, or of a method described elsewhere herein, further includes retrieving at least one of log data, core data, well test data and seismic data at one or more scales, and deriving one or more reservoir property values from such data.

In one or more specific embodiments, a method of evaluating a reservoir includes: providing a three dimensional reservoir framework at a flow simulation scale, wherein the three dimensional reservoir framework includes a plurality of cells; assigning one or more constant reservoir property values to some or all of the cells to provide a three dimensional reservoir model; performing a flow simulation on the three dimensional reservoir model; and performing an assessment of the reservoir based on the three dimensional reservoir model.

In a specific embodiment of the method identified above, or of a method described elsewhere herein, performing the assessment includes calculating a net present value for the reservoir.

In a specific embodiment of the method identified above, or of a method described elsewhere herein, the constant property values include a plurality of constant net-to-gross values.

In a specific embodiment of the method identified above, or of a method described elsewhere herein, the constant property values include a plurality of constant porosity values.

In a specific embodiment of the method identified above, or of a method described elsewhere herein, the constant property values include a plurality of constant permeability values.

A specific embodiment of the method identified above, or of a method described elsewhere herein, further includes: determining whether the three dimensional reservoir model needs to be updated; and populating some or all of the cells with one or more variable porosity and permeability values if the three dimensional reservoir model needs to be updated.

A specific embodiment of the method identified above, or of a method described elsewhere herein, further includes: determining whether the three dimensional reservoir model needs to be updated; and populating some or all of the cells with one or more variable net-to-gross values if the three dimensional reservoir model needs to be updated.

A specific embodiment of the method identified above, or of a method described elsewhere herein, further includes: determining whether the three dimensional reservoir model needs to be updated; and populating some or all of the cells with one or more net-to-gross values derived from seismic data if the three dimensional reservoir model needs to be updated.

A specific embodiment of the method identified above, or of a method described elsewhere herein, further includes: determining whether the three dimensional reservoir model needs to be updated; and populating some or all of the cells with one or more net-to-gross values derived from production data if the three dimensional reservoir model needs to be updated.

A specific embodiment of the method identified above, or of a method described elsewhere herein, further includes: providing a three dimensional reservoir framework having a plurality of cells; assigning one or more constant reservoir property values to some or all of the cells to provide a first three dimensional reservoir model; updating the first three dimensional reservoir model by populating some or all of the cells with one or more variable reservoir property values to provide a second three dimensional reservoir model; and comparing a net present value for the reservoir based on the first three dimensional reservoir model with a net present value for the reservoir based on the second three dimensional reservoir model.

In a specific embodiment of the method identified above, or of a method described elsewhere herein, the constant reservoir property values includes a plurality of constant rock-type fraction (e.g. net-to-gross), porosity and permeability values.

In a specific embodiment of the method identified above, or of a method described elsewhere herein, providing the three dimensional reservoir framework includes providing the three dimensional reservoir framework at a flow simulation scale.

In a specific embodiment of the method identified above, or of a method described elsewhere herein, updating the first three dimensional reservoir model includes populating some or all of the cells with one or more variable porosity and permeability values.

In one or more specific embodiments, a method of evaluating a reservoir includes: providing a three dimensional reservoir framework, wherein the reservoir framework includes a plurality of cells; assigning one or more constant reservoir property values to some or all of the cells to provide a first three dimensional reservoir model; updating the first three dimensional reservoir model by populating some or all of the cells with one or more reservoir property values derived from seismic data to provide a second three dimensional reservoir model; and comparing a net present value for the reservoir based on the first three dimensional reservoir model with a net present value for the reservoir based on the second three dimensional reservoir model.

In a specific embodiment of the method identified above, or of a method described elsewhere herein, the constant reservoir property values include a plurality of constant rock-type fraction (e.g. net-to-gross), porosity and permeability values.

In a specific embodiment of the method identified above, or of a method described elsewhere herein, providing the three dimensional reservoir framework includes providing the three dimensional reservoir framework at a flow simulation scale.

In a specific embodiment of the method identified above, or of a method described elsewhere herein, updating the first three dimensional reservoir model includes populating some or all of the cells with one or more net-to-gross values derived from seismic data.

SPECIFIC EMBODIMENTS IN DRAWINGS

Specific embodiments shown in the drawings will now be described. FIGS. 1A-1D illustrate a flow diagram of a method for evaluating a reservoir. In one embodiment, steps 10 through 60 may be referred to as a discovery pass, steps 70 through 110 may be referred to as a low frequency pass, steps 120 through 160 may be referred to as a high frequency pass and steps 170 through 210 may be referred to as a seismic frequency pass.

Discovery Pass

At step 10, input data are retrieved from various data sources. Input data can include, for example, seismic data, electronic well log data, flow measurements on core samples, well flow test and geological interpretations. These data provide information about a reservoir at varying scales. Such data may be retrieved using conventional methods known by persons with ordinary skill in the art.

At step 20, a three dimensional reservoir framework is built. The reservoir framework defines the bulk volume of the reservoir. Building the three dimensional reservoir framework preferably includes defining the top and bottom surfaces of the framework and the fault traces in the framework. The top surface, the bottom surface and the fault traces may be determined from the seismic data Building the three dimensional reservoir framework may further include dividing the reservoir framework into stratigraphic sequences, which may be derived from core, log and well test data, and dividing each stratigraphic sequence into layers. In one embodiment, the three dimensional reservoir framework is built at a flow simulation scale. That is, the three dimensional reservoir framework is built at a scale at which flow simulation can be performed. As mentioned above in the definition section, the flow simulation scale refers to the dimensions (length, width, and thickness) of each cell (defined above) used to define a three dimensional reservoir model (defined above) on which flow simulation will be performed. At the flow simulation scale, well flow tests may provide information about reservoir permeability. At the flow simulation scale, each stratigraphic sequence may be divided into 10 to 100 foot layers. In this manner, embodiments of the invention minimize, if not eliminate, any scaling adjustments to the three dimensional reservoir model, e.g., upscaling and downscaling, prior to performing flow simulation on the three dimensional reservoir model.

At step 30, constant reservoir property values, such as rock-type fraction (e.g. net-to-gross), porosity and permeability values, are assigned to some or all of the cells in the three dimensional reservoir framework, to build a three dimensional reservoir model. In one embodiment, the rock-type fraction (e.g. net-to-gross), porosity and permeability values are the average values for each cell according to its environments of depositions (EOD), stratigraphic sequence, facies or rock type.

At step 40, a flow simulation on the three dimensional reservoir model is performed. A flow simulation is defined herein as a numerical method of simulating the transport of mass (typically fluids, such as oil, water and gas), energy, and momentum through a physical system using a computer. A detailed description for flow simulation is provided in the definition section above. The flow simulation used herein may be any flow simulation conventionally known by persons of ordinary skill in the art.

At step 50, an assessment of the reservoir is made. Such assessment may include an economical assessment or an engineering assessment of the reservoir, or both. An economical assessment of the reservoir may include calculating the net present value of the reservoir based on the three dimensional reservoir model. An engineering assessment of the reservoir may include providing feedback on modeling uncertainties that may impact the net present value of the reservoir. A more detailed description bf the engineering assessment and economical assessment is provided in the definition section of this application. Making an assessment simply based on a reservoir framework assigned with constant reservoir properties provides many members of the reservoir evaluation team, including geophysicists, geologists and engineers, an opportunity to participate in the reservoir evaluation early in the process. In addition to economical and engineering assessments, embodiments of invention described herein contemplate other types of assessments generally made in connection with a reservoir. Conventional assessment techniques can be used, or adapted to be used, based on the method(s) described herein.

Low Frequency Pass

At step 60, a determination is made as to whether the three dimensional reservoir model needs to be updated. If the answer is in the negative, processing preferably stops. On the other hand, if the answer is in the affirmative, then processing should continue to step 70 at which the three dimensional reservoir model is updated. In one embodiment, the three dimensional reservoir model is updated only if new data are available. The three dimensional reservoir model may be updated by populating some or all of the cells in the reservoir framework with variable porosity and permeability values, thereby creating a second three dimensional reservoir model. Populating the reservoir framework with variable porosity and permeability values provides the second three dimensional reservoir model with a higher level of granularity than the first three dimensional reservoir model. The variable porosity and permeability values may be derived from a histogram of porosity and permeability values using a geostatistical estimation, which is briefly described in the definition section of this document. In one embodiment, the reservoir framework used to update the three dimensional reservoir model at step 70 is the same one previously built at step 20. In another embodiment, the reservoir framework includes the same constant net-to-gross values that were assigned at step 30.

At step 80, a flow simulation on the second three dimensional reservoir model is performed. The flow simulation performed on the second three dimensional reservoir model can be any conventional flow simulation method known by ordinary persons skilled in the art. In one embodiment, the flow simulation performed at step 40 may also be performed at step 80. As such, a general description and definition of the flow simulation may be provided above with reference to step 40.

At step 90, an assessment of the reservoir using the second three dimensional reservoir model is made. In one embodiment, assessments made with reference to step 50 may also be made at step 90. As previously mentioned, such assessment may include an economical assessment or an engineering assessment of the reservoir or both. Each assessment is described above in more detail.

At step 100, the assessments made using the first three dimensional reservoir model is compared with the assessments made using the second three dimensional reservoir model. For example, the net present value of the reservoir based on the second three dimensional reservoir model may be compared with the net present value of the reservoir based on the first three dimensional reservoir model. In this manner, a determination may be made as to whether the second three dimensional reservoir model needs to be updated (step 110).

High Frequency Pass

If the answer to the determination in step 110 is in the negative, then processing preferably stops. On the other hand, if the answer is in the affirmative, then processing preferably continues to step 120 at which the second three dimensional reservoir model is updated. The second three dimensional reservoir model may be updated by populating some or all of the cells in the reservoir framework with variable rock-type fraction (e.g. net-to-gross), along with porosity and permeability values, thereby creating a third three dimensional reservoir model. Populating the reservoir framework with variable rock-type fraction (e.g. net-to-gross), porosity and permeability values provides the third three dimensional reservoir model with a higher level of granularity than the second three dimensional reservoir model. The variable net-to-gross values may be derived from a histogram of net-to-gross values using geostatistics. Seismic data may be qualitatively used to incorporate trends into the variable net-to-gross values. In one embodiment, the reservoir framework used to update the second three dimensional reservoir model at step 120 is the same one previously built at step 20.

At step 130, a flow simulation on the third three dimensional reservoir model is performed. The flow simulation performed on the third three dimensional reservoir model can be any conventional flow simulation method known by ordinary persons skilled in the art. In one embodiment, the flow simulation performed at step 40 may also be performed at step 130. As such, a general description and definition of the flow simulation may be provided above with reference to step 40.

At step 140, an assessment of the reservoir using the third three dimensional reservoir model is made. In one embodiment, assessments made with reference to step 50 may also be made at step 140. As previously mentioned, such assessment may include an economical assessment or an engineering assessment of the reservoir or both. A more detailed description of each assessment is provided above.

At step 150, the assessments made using the third three dimensional reservoir model is compared with the assessments made using the second three dimensional reservoir model. For instance, the net present value of the reservoir based on the third three dimensional reservoir model may be compared with the net present value of the reservoir based on the second three dimensional reservoir model. In this manner, a determination may be made as to whether the third three dimensional reservoir model needs to be updated (step 160).

Seismic Frequency Pass

If the answer to the determination in step 160 is in the negative, then processing preferably stops. On the other hand, if the answer is in the affirmative, then processing preferably continues to step 170 at which the third three dimensional reservoir model is updated. The third three dimensional reservoir model may be updated by populating some or all of the cells in the reservoir framework with net-to-gross values directly derived from the seismic data, thereby creating a fourth three dimensional reservoir model. The net-to-gross values may be derived from seismic data using a mathematical function that is typically calibrated to known net-to-gross values from well log and core data. Populating the reservoir framework with net-to-gross values directly derived from the seismic data provides the fourth three dimensional reservoir model more precisely tied to seismic data than the third three dimensional reservoir model, which was populated with variable net-to-gross values derived from a histogram of net-to-gross values using geostatistics. In one embodiment, the reservoir framework used to update the third three dimensional reservoir model at step 170 is the same one previously built at step 20. In another embodiment, in addition to being populated by net-to-gross values directly derived from the seismic data, some or all of the cells may be populated with variable porosity and permeability values.

At step 180, a flow simulation on the fourth three dimensional reservoir model is performed. The flow simulation performed on the fourth three dimensional reservoir model can be any conventional flow simulation method known by ordinary persons skilled in the art. In one embodiment, the flow simulation performed at step 40 may also be performed at step 180. As such, a general description and definition of the flow simulation may be provided above with reference to step 40.

At step 190, an assessment of the reservoir using the fourth three dimensional reservoir model is made. In one embodiment, assessments made with reference to step 50 may also be made at step 190. As previously mentioned, such assessment may include an economical assessment or an engineering assessment of the reservoir or both. A more detailed description of each assessment may be found with reference to step 50 described above.

At step 200, the assessments made using the fourth three dimensional reservoir model is compared with the assessments made using the third three dimensional reservoir model. For instance, the net present value of the reservoir based on the fourth three dimensional reservoir model may be compared with the net present value of the reservoir based on the third three dimensional reservoir model. In this manner, a determination may be made as to whether the fourth three dimensional reservoir model needs to be updated (step 210).

Once a three dimensional reservoir model has been built using net-to-gross values directly derived from the seismic data, processing with respect to evaluating a reservoir based on seismic data, electronic well logs, flow measurements on core samples, well flow test and geological interpretations ends. However, the three dimensional reservoir model may continue to be updated using data retrieved during production, as typically performed by persons of ordinary skill in the art.

Accordingly, if the answer to the determination in step 210 is in the negative, then processing stops. On the other hand, if the answer is in the affirmative, then processing continues to step 220 at which the fourth three dimensional reservoir model is updated. The fourth three dimensional reservoir model may be updated by populating some or all of the cells in the reservoir framework with net-to-gross values directly derived from production data, thereby creating a fifth three dimensional reservoir model. In one embodiment, the reservoir framework used to update the fourth three dimensional reservoir model at step 220 is the same one previously built at step 20. In another embodiment, in addition to being populated with net-to-gross values derived from production data, some or all of the cells are also populated with variable porosity and permeability values.

Figure 2:
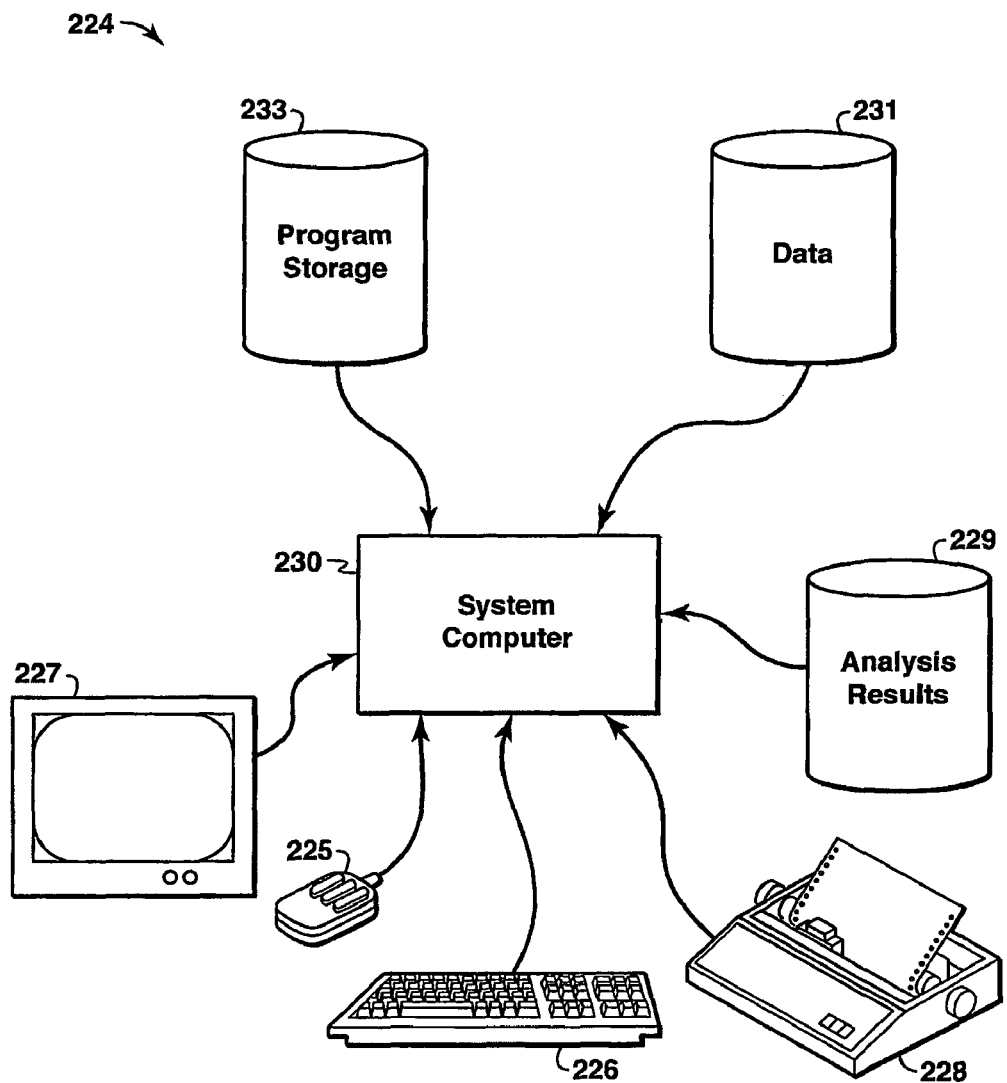
FIG. 2 illustrates a computer network, also discussed below.

FIG. 2 illustrates a computer network 224, into which embodiments of the invention may be implemented. The computer network 200 includes a system computer 230, which may be implemented as any conventional personal computer or workstation, such as a UNIX-based workstation. The system computer 230 is in communication with disk storage devices 229, 231, and 233, which may be external hard disk storage devices. It is contemplated that disk storage devices 229, 231, and 233 are conventional hard disk drives, and as such, will be implemented by way of a local area network or by remote access. Of course, while disk storage devices 229, 231, and 233 are illustrated as separate devices, a single disk storage device may be used to store any and all of the program instructions, measurement data, and results as desired.

In one embodiment, the input data are stored in disk storage device 231. The system computer 230 may retrieve the appropriate data from the disk storage device 231 to perform the reservoir evaluation according to program instructions that correspond to the methods described herein. The program instructions may be written in a computer programming language, such as C++, Java and the like. The program instructions may be stored in a computer-readable memory, such as program disk storage device 233. Of course, the memory medium storing the program instructions may be of any conventional type used for the storage of computer programs, including hard disk drives, floppy disks, CD-ROMs and other optical media, magnetic tape, and the like.

According to a preferred embodiment, the system computer 230 presents output primarily onto graphics display 227, or alternatively via printer 228. The system computer 230 may store the results of the methods described above on disk storage 229, for later use and further analysis. The keyboard 226 and the pointing device (e.g., a mouse, trackball, or the like) 225 may be provided with the system computer 230 to enable interactive operation.

The system computer 230 may be located at a data center remote from the reservoir. While FIG. 2 illustrates the disk storage 231 as directly connected to the system computer 230, it is also contemplated that the disk storage device 231 may be accessible through a local area network or by remote access. Furthermore, while disk storage devices 229, 231 are illustrated as separate devices for storing input data and analysis results, the disk storage devices 229, 231 may be implemented within a single disk drive (either together with or separately from program disk storage device 233), or in any other conventional manner as will be fully understood by one of skill in the art having reference to this specification.

What is claimed is:

1. A method of evaluating a reservoir, comprising:
   providing a three dimensional reservoir framework having a plurality of cells;
   assigning one or more constant reservoir property values to some or all of the cells to provide a first three dimensional reservoir model;
   on a computer, performing a flow simulation on the first three dimensional reservoir model;
   making an assessment of the reservoir using the first three dimensional reservoir model;
   when it is determined that the first three dimensional reservoir model is to be updated, updating the first three dimensional reservoir model by populating some or all of the cells with one or more variable reservoir property values to provide a second three dimensional reservoir model;
   on a computer, performing a flow simulation on the second three dimensional reservoir model;
   making an assessment of the reservoir using the second three dimensional reservoir model;
   comparing the assessment of the reservoir made using the first three dimensional reservoir model with the assessment of the reservoir made using the second three dimensional reservoir model;
   when it is determined that the second three dimensional model is to be updated, updating the second three dimensional reservoir model by populating some or all of the cells with one or more rock-type fraction, porosity and permeability property values to provide a third three dimensional reservoir model;
   on a computer, performing a flow simulation on the third three dimensional reservoir model;
   making an assessment of the reservoir using the third three dimensional reservoir model;
   comparing the assessment of the reservoir made using the second three dimensional reservoir model with the assessment of the reservoir made using the third three dimensional reservoir model;
   when it is determined that the third three dimensional model is to be updated, updating the third three dimensional reservoir model by populating some or all of the cells with net-to-gross values directly derived from seismic data to provide a fourth three dimensional reservoir model;
   on a computer, performing a flow simulation on the fourth three dimensional reservoir model;
   making an assessment of the reservoir using the fourth three dimensional reservoir model;
   comparing the assessment of the reservoir made using the third three dimensional reservoir model with the assessment of the reservoir made using the fourth three dimensional reservoir model; and
   when it is determined that the fourth three dimensional model is to be updated, updating the fourth three dimensional reservoir model by populating some or all of the cells with net-to-gross values directly derived from production data to provide a fifth three dimensional reservoir model.

2. The method of claim 1, wherein providing the three dimensional reservoir framework comprises building the three dimensional reservoir framework.

3. The method of claim 1, wherein the constant reservoir property values include a plurality of constant rock-type fraction values.

4. The method of claim 1, wherein the variable reservoir property values include a plurality of constant porosity values.

5. The method of claim 1, wherein the variable reservoir property values include a plurality of constant permeability values.

6. The method of claim 1, wherein the variable reservoir property values include a plurality of variable rock-type fraction values.

7. The method of claim 1, wherein the variable reservoir property values include a plurality of variable porosity values.

8. The method of claim 1, wherein the variable reservoir property values include a plurality of variable permeability values.

9. The method of claim 1, wherein the reservoir property values derived from the seismic data comprises a plurality of rock-type fraction values derived from seismic data.

10. The method of claim 1, wherein updating the second three dimensional reservoir model comprises populating some or all of the cells with variable porosity values.

11. The method of claim 1, wherein updating the second three dimensional reservoir model comprises populating some or all of the cells with variable permeability values.

12. The method of claim 1, wherein each cell has a preselected scale.

13. The method of claim 1, wherein providing the three dimensional reservoir framework comprises providing the three dimensional reservoir framework at a flow simulation scale.

14. The method of claim 1, wherein providing the three dimensional reservoir framework comprises defining a top and bottom surface of the reservoir framework.

15. The method of claim 1, wherein providing the three dimensional reservoir framework comprises dividing the three dimensional reservoir framework into one or more stratigraphic sequences.

16. The method of claim 1, wherein providing the three dimensional reservoir framework comprises dividing the three dimensional reservoir framework into one or more stratigraphic sequences; and dividing each stratigraphic sequence into one or more layers.

17. The method of claim 1, wherein the constant reservoir property values are average values.

18. The method of claim 1, wherein making an assessment of the reservoir using at least one of the first, second, third fourth, and fifth three dimensional reservoir models comprises calculating a net present value for the reservoir based on the at least one of the first, second, third, fourth, and fifth three dimensional reservoir models.

19. The method of claim 1, wherein comparing the assessment of the reservoir made using one of the three dimensional models with the assessment of the reservoir made using a subsequently provided three dimensional reservoir model comprises:

calculating a net present value for the reservoir based on said one of the three dimensional reservoir models;

calculating a net present value for the reservoir based on a subsequently provided three dimensional reservoir model; and comparing the calculated net present values.

20. The method of claim 1, wherein the variable reservoir property values are populated using geostatistics.

21. The method of claim 1, further comprising retrieving data at one or more scales, and deriving one or more reservoir property values from such data.

22. The method of claim 1, further comprising retrieving at least one of log data, core data, well test data and seismic data at one or more scales, and deriving one or more reservoir property values from such data.

23. The method of claim 3, wherein the rock-type fraction values are net-to-gross values.

24. The method of claim 6, wherein the rock-type fraction values are net-to-gross values.

25. The method of claim 1, wherein making an assessment comprises calculating for the reservoir at least one of net present value, discounted cash flow rate, maximum cash impairment, return on capital, and any combination thereof.

* * * * *